Sept. 23, 1969   M. B. SAMPSON   3,468,551
CHUCK
Filed Jan. 24, 1966   3 Sheets-Sheet 1

INVENTOR.
MERRITT B. SAMPSON
BY Watts & Fisher, Attys.

Sept. 23, 1969   M. B. SAMPSON   3,468,551
CHUCK
Filed Jan. 24, 1966   3 Sheets-Sheet 2

INVENTOR.
MERRITT B. SAMPSON
BY Watts & Fisher, Attys.

Sept. 23, 1969   M. B. SAMPSON   3,468,551
CHUCK

Filed Jan. 24, 1966   3 Sheets-Sheet 3

INVENTOR.
MERRITT B. SAMPSON
Watts & Fisher, Attys.

United States Patent Office 3,468,551
Patented Sept. 23, 1969

3,468,551
CHUCK
Merritt B. Sampson, Shaker Heights, Ohio, assignor to
The S-P Manufacturing Corporation
Filed Jan. 24, 1966, Ser. No. 522,706
Int. Cl. B23b 31/30, 31/10, 5/34
U.S. Cl. 279—4                                    9 Claims

ABSTRACT OF THE DISCLOSURE

A chuck with an internal jaw operating motor, in which jaw operating linkages between the motor and jaws are located radially about the motor.

---

This invention relates to metal working chucks, and more particularly to a compact chuck which is especially suited for use in a drill press or the like.

In the machining of metal parts it is customary to grip the metal workpiece in a work holder, such as a chuck. The chuck may be rotated, as in a lathe, or the chuck may be stationary and the tool rotated, as with a drill press. Conventional lathes support the chuck on a rotating spindle in a head stock. A draw bar or other chuck actuating mechanism in the head stock connects the chuck with a cylinder that opens and closes the chuck jaws. In other machine tools, such as drill presses, the work piece is mounted on a table or bed and lathe type chuck actuating mechanisms are not useable.

In these applications, special adapters are usually required to facilitate workpiece holding. In a vertical drill press, for example, there is limited space between the drill spindle and the bed or table on which a workpiece rests. Because of this space limitation it has been customary in the past to individually clamp workpieces on the bed. Typically Z shaped holddowns overlie portions of the workpiece and the hold-downs are bolted to the bed. Set up time is relatively long and production is slow when the workpieces are thus individually clamped.

In attempts to reduce the set up time, chucks and chuck actuators for use on drill presses and the like have been proposed in which the chuck is mounted on top of a fluid actuator. The actuator is secured to the drill press table and connected to the jaw actuator of the chuck to control jaw movement. This is disadvantageous because the bulk of both the work holder and the actuator on the table reduces the clearance between the spindle and the plane where the workpiece is positioned. This of course reduces the size workpiece which can be accommodated. The problem becomes acute with machines in which the distance from the supporting table to the tool spindles is limited and where the workpiece may itself be large. In addition, the expense involved in providing a complement of chuck actuators in addition to the chucks is often substantial.

The present invention combines the advantages of both prior systems. That is, the chuck of this invention is (1) sufficiently compact, axially speaking to have substantially the same workpiece size capacity as conventional clamping techniques and (2) at the same time requires as low or lower set up times than any prior arrangement.

In accordance with the present invention, a chuck has been provided that includes a single self-contained fluid actuator for operating the chuck jaws. The actuator is a fluid motor, specifically a double acting cylinder and piston totally contained within a central cavity of the chuck body. The cylinder and piston are located centrally of the chuck body and extend axially between the back plate and front face of the chuck. Radially movable chuck jaws are located in the front face of the chuck body and movement of the chuck jaws is controlled by associated levers pivoted within the chuck. The levers extend radially from the central cavity and are pivoted by axial movement of an annular draw cam within the chuck. To reduce the axial length of the linkage, the draw cam surrounds the cylinder and piston in telescoping relationship. The cam is connected to a piston rod that extends from the actuating cylinder so that movement of the piston causes axial movement of the cam. Fluid under pressure is supplied to the fluid motor through conduits that communicate through the peripheral side wall of the chuck and through the walls of the dust bushing. Thus, the need for connections behind the chuck and through the base plate is eliminated and since the levers are around the piston the chuck is very short. In addition, the use of a single piston within the central cavity of the chuck to actuate all of the jaw-operating levers provides a fluid-operated universal chuck of small diameter that is yet capable of exerting high gripping force by virtue of the mechanical advantage of the levers. Moreover, this construction results in a very strong and rugged, as well as compact, chuck.

An important feature of this invention is the incorporation of the cylinder and piston in the axially extending body portion of a dust bushing that seals the central cavity of the chuck. The dust bushing extends part way into the body of the chuck from the front radial surface and is in part surrounded by the lever-actuating draw cam in the normal manner. A piston rod extends from the inside end of the dust bushing and is connected to the body of the cam. Movement of the piston and piston rod in response to fluid pressure supplied to the cylinder formed by the dust bushing reciprocates the draw cam axially of the chuck within the central cavity of the chuck body. Movement of the cam rocks all of the jaw operating levers to move the jaws radially of the central axis of the chuck body. This arrangement permits a conventional drawbar-actuated lever-operated chuck to be adapted for use on a drill press with only minimal modifications.

The jaw operating cam and levers of this chuck are constructed and arranged to cooperate to provide a locking action once the jaws are moved to a closed position. Thus, once the jaws are tightly closed, they remain locked in position without being dependent upon the magnitude of the fluid pressure.

Advantageously, a booster system is provided for use in combination with the chuck. This permits the use of a relatively small piston and cylinder within the body of the chuck, while yet providing high actuating pressures to increase the work gripping force. The booster system may be located remotely from the chuck and connected via conduits to the passageways through the chuck body to the cylinder.

Other features and advantages of this invention will be appreciated as the invention becomes better understood from the following detailed description, when taken in connection with the accompanying drawings, in which.

Figure 2:
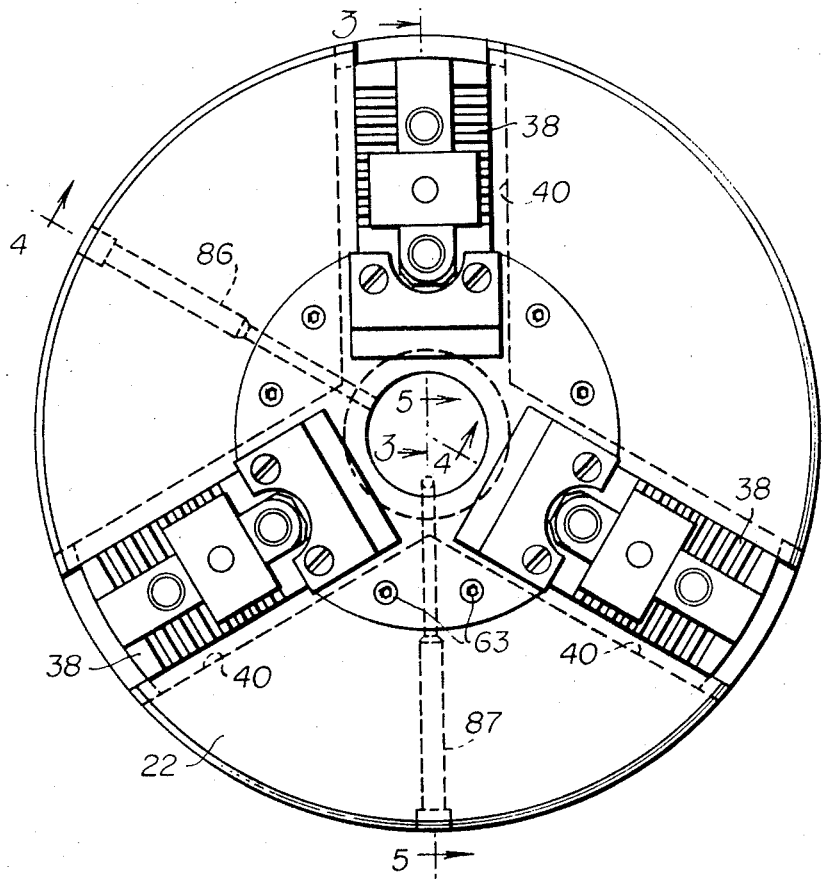
FIGURE 2 is a top plan view of the front radial face of a chuck constructed in accordance with the present invention.
Figure 4:
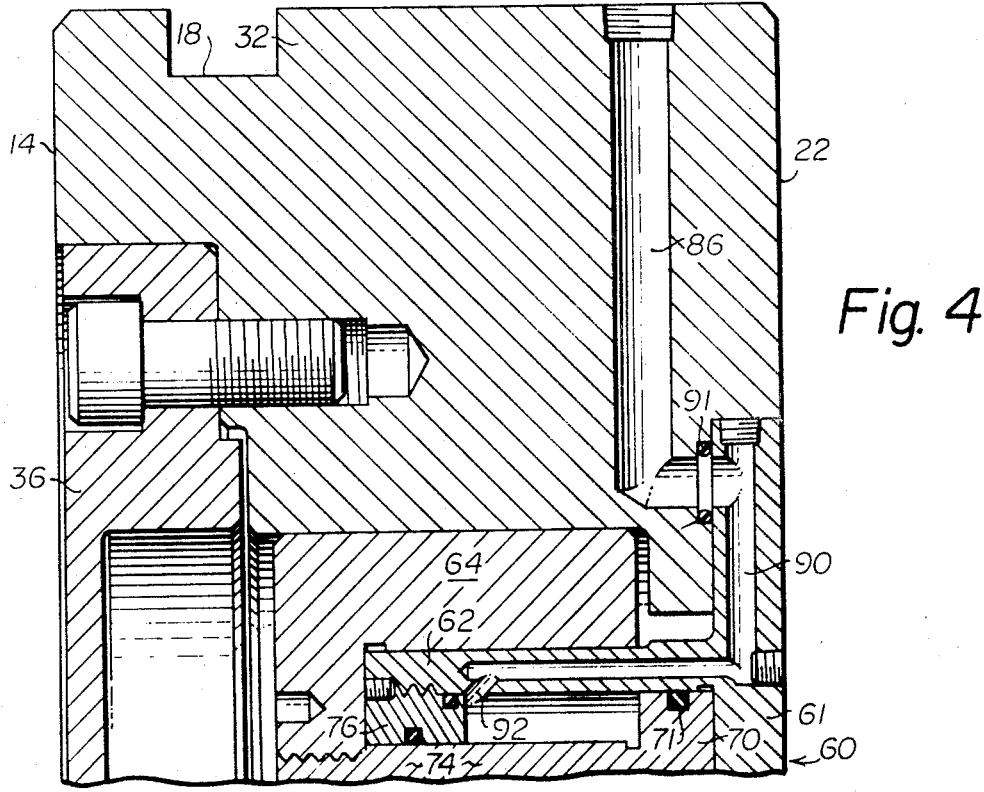
Figure 5:
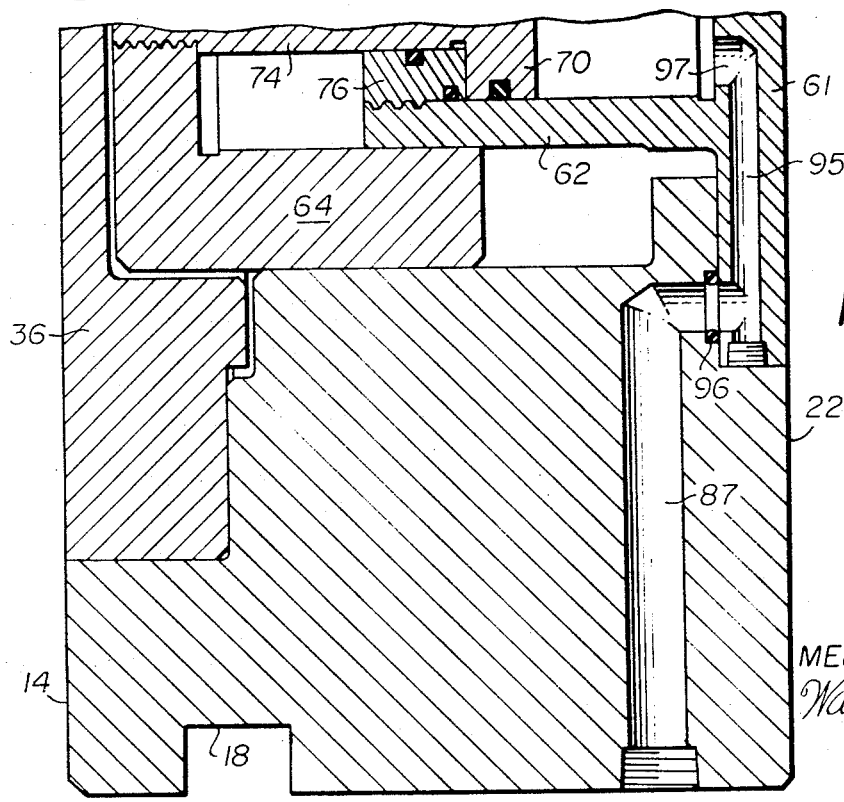

FIGURE 4 is a partial transverse sectional view of the chuck of FIGURE 2 taken along the line 4—4 looking in the direction of the arrows, showing the actuating piston moved to the front of the cylinder to open the chuck jaws; and FIGURE 5 is a partial transverse sectional view taken along the line 5—5 of FIGURE 2 looking in the direction of the arrows, showing the piston rod of the cylinder in an extended position to exert a closing force on the radially movable jaws.

Figure 1:
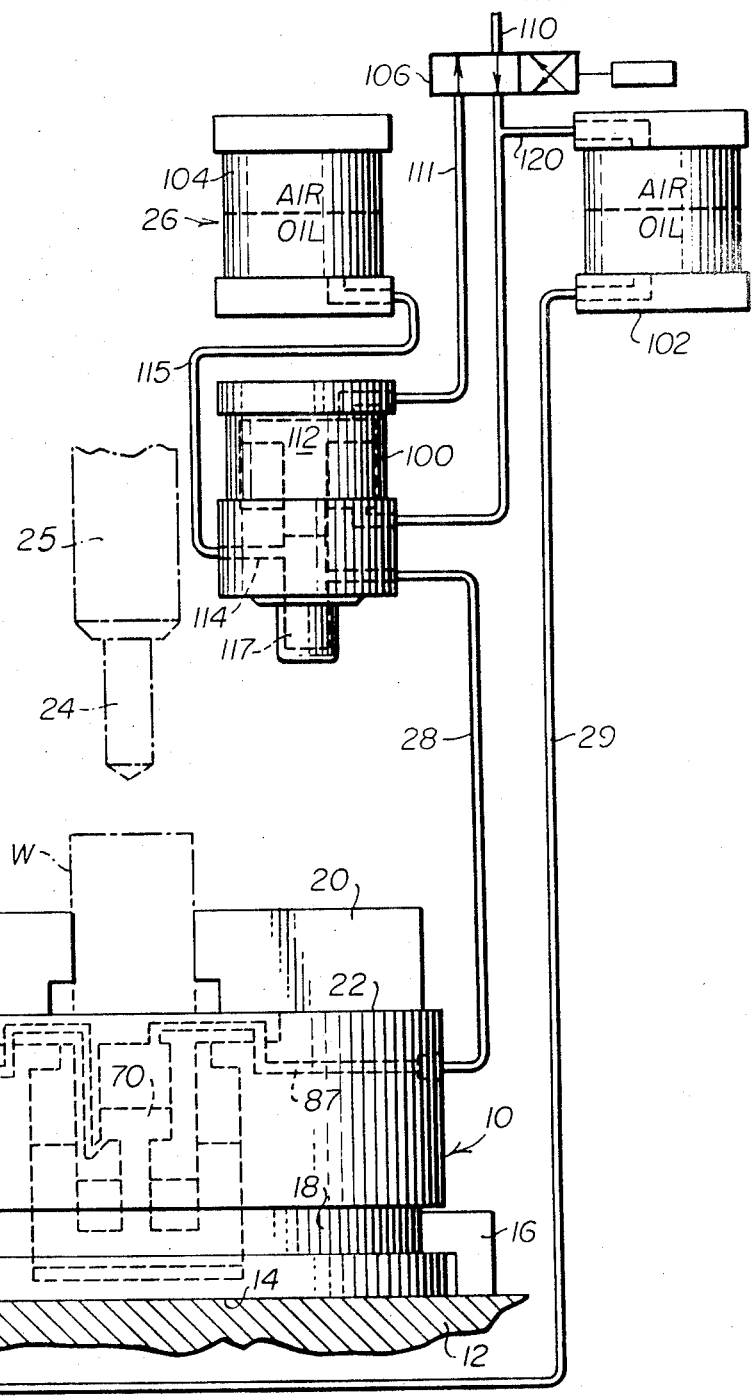
FIGURE 1 is a diagrammatic front elevation view of a chuck constructed in accordance with this invention and illustrated on a drill press table, and showing diagrammatically a pressure booster system associated with the chuck.

Referring now to the drawings, there is shown in FIGURE 1 a diagrammatic arrangement of a chuck 10 constructed in accordance with this invention and mounted on a drill press table 12. The chuck 10 is oriented in a horizontal position (i.e., with the central axis vertical) with a base surface 14 flush wtih the top of the drill press table 12. Circumferentially spaced clamps 16 secured to the drill press table 12 engage a peripheral groove 18 of the chuck 10 and secure the chuck to the table. Radially movable work gripping jaws 20 extend from a front surface 22 of the chuck 10 and clamp a work piece W in position to be drilled by a cutting tool 24 rotated in a drill press spindle 25. In the conventional manner, the cutting tool 24 and the spindle 25 are vertically movable with respect to the chuck 10 and work piece W. A pressure booster system, indicated generally at 26, is connected by conduits 28, 29 to the chuck 10 for operating the work griping jaws 20. The pressure booster system will be described in more detail subsequently.

Referring now more particularly to FIGURES 2 to 5, the chuck 10 is shown comprised of a cylindrical body formed of a radial front face 22, a peripheral wall 32, an annular rear flange 34, and a circular base plate 36.

Three equally spaced master chuck jaws 38 to which the work gripping jaws 20 are secured, are radially movable in slideways 40 in the front face 22 and peripheral wall 32 of the chuck body. As best shown in FIGURE 2, the chuck jaws 38 converge upon the center axis of the chuck.

Figure 3:
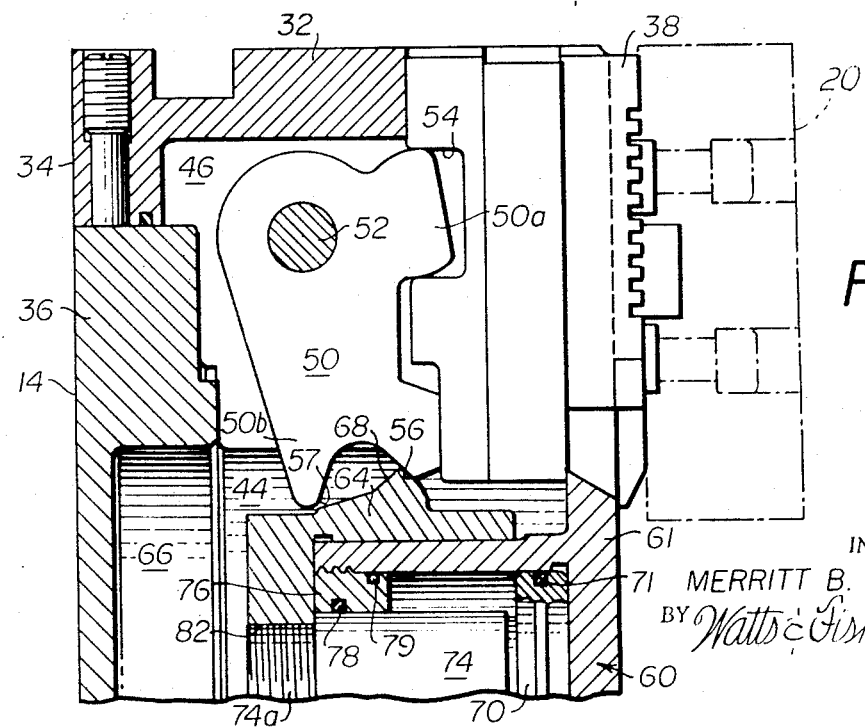
FIGURE 3 is a partial transverse sectional view taken along the line 3—3 of FIGURE 2 looking in the direction of the arrows.

The chuck body 10 is formed with an axially extending central cavity 44, see FIGURE 3. Three radially extending cavities 46 are formed in the chuck body, one directly behind each chuck jaw 38. Three radially extending cavities 46 are in direct communication with the central cavity 44.

An operating lever arm 50 is located within each radially extending cavity 46 and is pivotally mounted upon a lever pin 52 carried by the chuck body. Each operating lever arm 50 is in the form of a bell crank lever, and has a relatively short arm 50a and a longer arm 50b. The shorter arm 50a is engaged in a slot 54 in the back of the associated chuck jaw 38. The end of the longer arm 50b of the operating lever is contoured to form two cam following surfaces indicated at 56 and 57.

An annular dust bushing 60 is located in the central cavity 44 of the chuck body 10. The dust bushing includes a radial face portion and flange 61 and an axilly extending tubular wall 62. The radial portion 61 is recessed in the front surface 22 of the chuck body and secured in place by machine screws 63. An annular draw cam 64 is also located within the cavity 44 and partially surrounds the axially extending tubular wall 62 of the dust bushing 60, in telescoping arrangement. One end of the draw cam 64 extends rearwardly of the chuck body 10, and is received in a circular recess 66 in the base plate 36 when the cam is moved to the rearmost position. Portions of the annular wall of the draw cam 64 are in the form of cam surfaces 68 that coact with the cam following surfaces 56 and 57 of the operating levers 50. Axial movement of the draw cam 64 causes pivotal movement of the operating lever arms 50 about the lever pins 52, moving the chuck jaws 38 radially of the chuck body in the ways 40. As best shown in FIGURE 3, rearward movement of the cam causes surfaces 68 to coact with the surface 57 of each lever, pivoting the levers clockwise to move the jaws 38 toward the central axis of the chuck. The surfaces 68 are formed to wedge the levers in closed position to maintain the jaws in position against load forces tending to open the jaws, independently of the actuating force.

An axially movable piston 70 is located within the tubular wall 62 of the dust bushing 60. A sealing ring 71 in the peripheral wall of the piston 70 provides a fluid-tight seal between the piston 70 and the inner surface of the tubular wall 62. A piston rod 74 is secured to the piston 70 and extends axially of the tubular body portion 62 of the dust bushing. An annular end wall 76 is threadedly secured inside the end of the tubular wall 62, spaced from the radially end wall 61 of the dust bushing. The annular end wall 76 closely encircles the piston rod 74. Seal rings 78 and 79 in the inner and outer walls, respectively, of the annular end wall 76 provide fluid-tight seals at the inner end of the cylinder formed by tubular wall 62. With this construction, the dust bushing 60, piston 70 and piston rod 74 form a fluid motor. A threaded end 74a of the piston rod 74 extends beyond the end wall 76 and is threadedly received in a circular opening 82 in the end of the draw cam 64. Reciprocal movement of the piston 70 and piston rod 74 moves the draw cam 64 axially along the outside surface of the tubular wall 62.

As best shown in FIGURES 2, 4 and 5, there are two radially extending conduits 86, 87 that communicate between the peripheral wall 32 of the chuck body and the dust bushing 60. The conduit 86 communicates with a conduit 90 that extends radially htrough the face portion 61 of the dust bushing 60. A seal ring 91 provides a fluid-tight seal between the dust bushing and the front face of the chuck. The conduit 90 continues through the tubular wall 62 and communicates to the interior of the dust bushing adjacent the annular end wall 76 through a port 92. The conduit 87 communicates with a radially extending conduit 95 in the face portion 61 of the dust bushing 60. A seal ring 96 seals the juncture. The conduit 95 communicates to the interior of the dust bushing through a port 97 in the radial end wall 61. The ports 92 and 97 communicate to the interior of the cylinder formed by wall 62 on opposite sides of the piston 70. Accordingly, axial movement of the piston 70, the connected piston rod 74 and the draw cam 64 is achieved by supplying fluid under pressure through one of ports 92 and 97 and exhausting fluid through the other. As shown in FIGURE 4, fluid pressure introduced through the port 92 via the conduits 86 and 90 biases the piston 70 to the front of the chuck body 10. This position is also shown in FIGURE 3, and illustrates the manner in which the chuck jaws are opened. As shown in FIGURE 5, fluid supplied through the port 97 via the conduits 87 and 95 biases the piston 70 toward the rear of the chuck body 10. This moves the draw cam 64 toward the back of the chuck and rocks the actuating levers 50 in a direction to close the chuck jaws. The construction of the levers provides a mechanical advantage that increases the closing force exerted by the draw cam.

Referring now to FIGURE 1, a booster system 26 is shown supplying hydraulic oil under pressure through conduits 28 and 29 to the conduits 87 and 86, respectively. The booster system 26 includes a booster 100, a tank 102, an oil makeup tank 104 and a four-way solenoid operated valve 106. The system is used to provide an intensified pressure for the short stroke of the piston 70. By actuating the four-way valve 106 to the left as shown in FIGURE 1, air under pressure from a source (not shown) is introduced through a conduit 110 to the conduit 111 and thence to the cap end of the booster 100. At the same time, the tank 102 is vented to atmosphere. This moves a ram 112 in the booster cylinder 100 downward as shown in FIGURE 1, which closes an inlet 114 through which oil is supplied via conduit 115 from the oil makeup tank 104. The pressure of the oil in a booster pressure chamber 117 of the booster 100 is intensified by movement of the ram 112. This causes the piston 70 to move downward, i.e., toward the rear of the chuck 10, in a high pressure stroke, closing the chuck jaws. To release the workpiece, the valve 106 is reversed to the position shown in the drawing. Air is supplied under pressure through conduit 110 and conduit 120 to the tank 102, supplying oil through the conduit 29 to the conduit 86 in the chuck 10, causing the piston 70 to make a low pressure return.

From the above description of the construction and operation of this device, it can be appreciated that a compact chuck and actuating system have been provided that afford ample chucking power in a compact unit. By locating the chuck actuator within the chuck body itself, the chuck may be mounted on tables or other machine tool parts that preclude operation through the base plate of the chuck. In addition, the disclosed arrangement provides a short axial length of the chuck body by arranging the essential working parts around the piston and cylinder in telescoping relationship. Because the dust bushing forms the fluid cylinder, a conventional lever-actuated jaw chuck may be converted to a fluid actuated chuck with a self contained hydraulic cylinder and piston with a minimum of modifications.

While a preferred embodiment has been described with particularity, it will be understood that numerous modifications or alterations may be made therein without departing from the spirit and scope of the invention, as set forth in the appended claims.

What is claimed is:

1. In a chuck having radially movable jaws, a central cavity and an annular jaw actuating cam axially movable within the cavity, the combination of a dust bushing having a radial portion and an annular body portion extending axially into the central cavity of the chuck, the inside of said annular body portion forming a fluid cylinder, a piston within the annular body portion axially movable within the body portion, a piston rod connected to the piston and extending from the body portion within the cavity, an end wall secured to the body portion spaced from the radial portion, said end wall having an opening encircling the piston rod, and means securing the piston rod to the annular cam.

2. The chuck of claim 1 including conduits extending in the dust bushing to carry fluid to and from the fluid cylinder formed by the annular body portion.

3. The chuck of claim 2 wherein the conduits extend radially through the radial portion and at least one conduit extends axially through the annular body portion of the dust bushing.

4. A chuck comprising: a chuck body having a base surface for locating the chuck with respect to a support, a front surface spaced from the base surface along a central axis of the chuck body, and a central cavity; a plurality of chuck jaws carried by the chuck body, mounted in the front face of the chuck body and movable radially of the central axis of the chuck body; a fluid motor within the central cavity of the chuck body, said fluid motor including a cylinder and piston, the piston being movable axially of the chuck body; a plurality of jaw operating levers pivotally supported within the chuck body, one associated with each chuck jaw and constructed and arranged to move the associated jaw radially of the chuck axis when pivoted; an annular lever-actuating cam surrounding the cylinder in telescoping relationship and axially slidable with respect thereto; and a piston rod connected between the piston and the annular lever-actuating cam, whereby operation of the fluid motor moves the chuck jaws toward and away from each other.

5. A chuck comprising: a chuck body having a front surface and a central cavity that opens through the front surface; a plurality of chuck jaws at the front surface carried by the chuck body and movable radially of a central axis of the chuck body; a dust bushing that closes the central cavity at the front surface of the chuck body and that extends axially into the central cavity; a fluid motor formed of a cylinder in the dust bushing and a piston movable in the cylinder in a direction axially of the chuck body; and a plurality of jaw-operating levers supported within the chuck body for pivotal movement, extending radially from the central cavity; said piston operatively associated with the jaw-operating levers at the central cavity of the chuck body.

6. A chuck comprising: a body, a plurality of master jaws carried by the body for movement radially of a generally central axis of the body and which are adapted to carry work-gripping jaws, a jaw actuating motor within the chuck body at the central axis, linkages between the motor and the master jaws located radially outward of the motor, the axial extent of said motor being substantially encompassed by the axial extent of said linkages and master jaws and surrounded radially thereby, whereby the axial extent of said body can be substantially minimized.

7. A chuck comprising: a body having a central axis; a plurality of master jaws carried by said body, supported for movement radially of the central axis, each having an outer surface adapted to carry a work-gripping jaw; a plurality of jaw actuating lever arms supported in said body, one behind each master jaw and connected to an inner portion thereof; a fluid motor within said body at the central axis thereof, with a fluid chamber extending axially of said body; and means for transmitting movement and force from said fluid motor to said lever arms so that operation of the fluid motor actuates the master jaws; the axial extent of said fluid chamber lying between the said outer surfaces of said master jaws and surfaces of said lever arms most remote from said outer surfaces.

8. The chuck of claim 4 including a base plate that in part forms the base surface of the chuck body, a central recess in the base plate within the chuck body and aligned with the central cavity to in part receive the actuating cam when the cam is moved to close the chuck jaws.

9. The chuck of claim 5 including conduits through the dust bushing for introducing and exhausting fluid under pressure to the fluid motor.

References Cited
UNITED STATES PATENTS

| 2,449,831 | 9/1948 | Arms et al. | 279—1 X |
| 2,814,496 | 11/1957 | Damijonaitis | 279—4 |
| 2,889,150 | 6/1959 | Goldring et al. | 279—4 |
| 3,087,736 | 4/1963 | Lukas | 279—4 |
| 3,143,356 | 8/1964 | Pray | 279—4 |
| 2,613,943 | 10/1952 | Trudeau | 279—119 X |
| 2,915,316 | 12/1959 | Ernest | 279—4 |
| 3,025,071 | 3/1962 | Larrad | 279—4 |
| 3,091,256 | 5/1963 | Becker | 279—4 |

ROBERT C. RIORDON, Primary Examiner

J. C. PETERS, Assistant Examiner

U.S. Cl. X.R.

279—119